July 16, 1935. M. H. LEVI 2,008,619
FOOD PLATTER OR DISH
Filed June 2, 1934
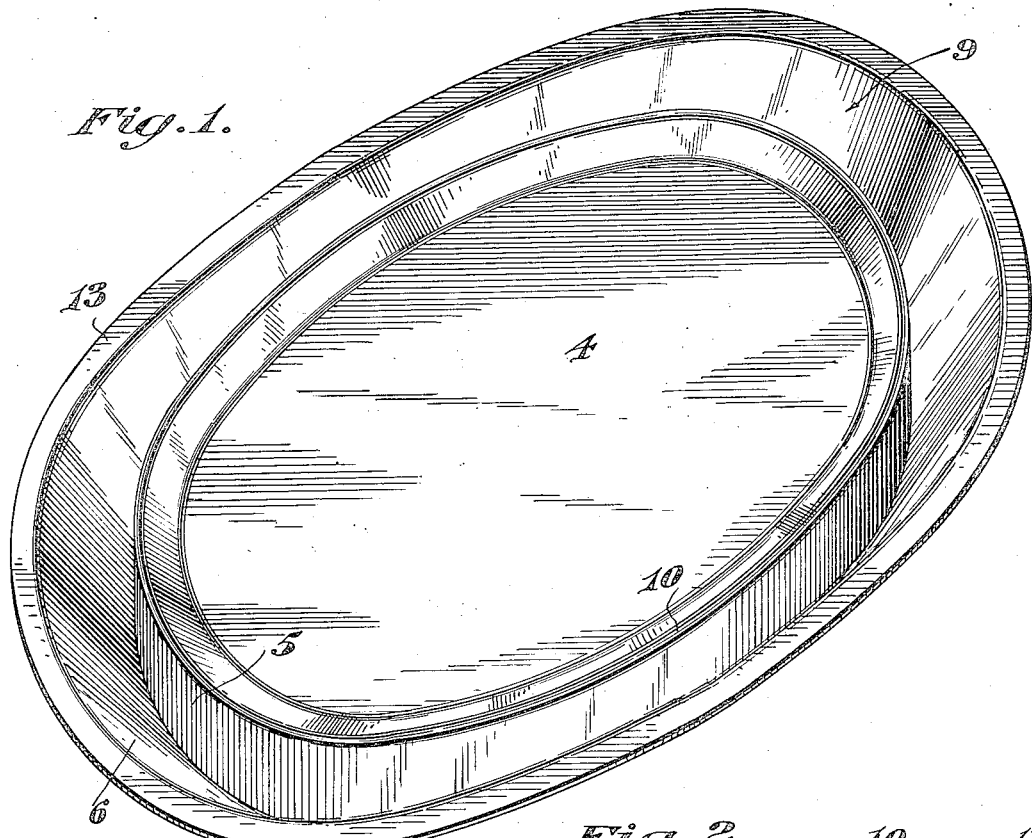
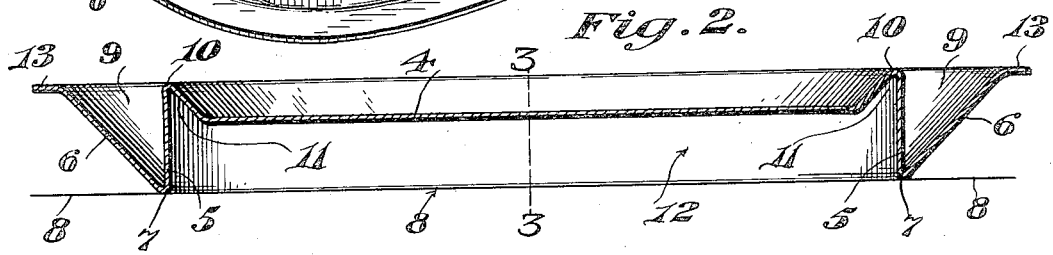
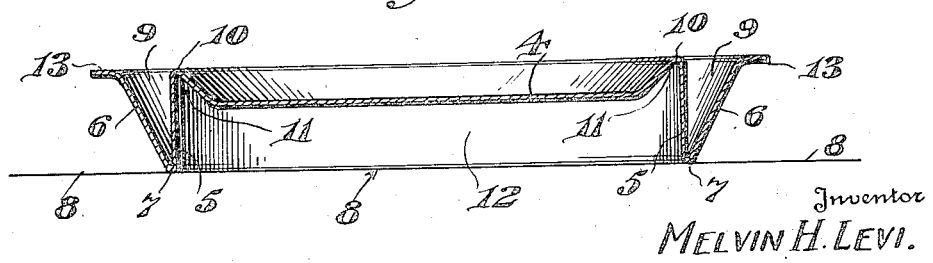
Inventor
MELVIN H. LEVI.

Patented July 16, 1935

2,008,619

UNITED STATES PATENT OFFICE 2,008,619

FOOD PLATTER OR DISH

Melvin H. Levi, Kew Gardens, N. Y.

Application June 2, 1934, Serial No. 728,784

1 Claim. (Cl. 65—15)

The present invention relates more particularly to a dish or platter for holding food, and while especially intended for public use, as in restaurants, hospitals, hotels, and the like, is obviously capable of employment generally wherever it is desired to maintain the food at an approximately desired temperature.

A further object is to provide a structure that can be easily produced and will present an attractive and ornamental appearance.

In the accompanying drawing:

Figure 1 is a perspective view of one embodiment that the invention may take.

Figure 2 is a vertical longitudinal sectional view,

Figure 3 is a vertical cross sectional view on the line 3—3 of Figure 2.

Preferably the plate or platter is of one piece of metal and is stamped to the ultimate form. The material of which it is made is, however, not of primary importance, except that it is of a character to be capable of free exchange of heat. It may therefore be of any material not usually recognized as having insulating or non-heat conducting properties.

In the embodiment disclosed a central tray portion is employed, comprising a bottom 4 which may be oval as shown or of any desired contour. Around this tray portion is a rim portion which depends below the bottom 4 and preferably consists of an inner continuous wall 5, an outer continuous wall 6, and a bottom 7, creating a support, which when the dish or platter is placed on a table or other surface 8, holds the bottom 4 above such surface. The walls 5 and 6 of the rim portion diverge upwardly and thus create around the tray 4 a channel 9 that is substantially V-shaped in cross section and constitutes a holder for a refrigerant, such as cracked ice or other heat-exchange material.

Separating the bottom 4 from the channel 9 is an upstanding rib 10 made by upsetting the material between the inner wall 5 and the bottom 4, and thus not only dishing the tray portion, but creating a barrier between it and the channel 9. The formation of the rib 10 creates in the underside a corresponding marginal channel 11, of which the inner wall 5 of the channel 9 forms the outer wall of said channel 11.

The food of other material to be kept cooled, or at a desired temperature, is placed on the tray 4, and in the channel is placed cracked ice or other heat exchange substance. It will be obvious that this produces an attractive dish for serving foods and that the ice will not only cool the food placed on the tray by reason of the extraction of heat through the material of the dish, but that when said tray is placed on a table or other supporting surface, a chamber 12 is formed beneath the bottom 4 and the inner wall 5, which is cooled by the material in the channel 9 and which therefore extracts the heat through the bottom 4 and from the food placed on said bottom.

Preferably as disclosed the rib 10 is of substantially the same level as the upper edge of the outer wall 6, and said wall may be provided with an outstanding peripheral flange 13 which serves to stiffen the dish as a whole and also provides convenient means for handling the same.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

A refrigerating or like dish comprising a central article-holding tray portion, a continuous upstanding barrier rib surrounding the tray portion and comprising an outwardly and upwardly sloping inner wall and a substantially vertical outer wall extending downwardly to a point below the tray portion, the said walls diverging from the top and forming a channel in the underside of the rib, and a marginal wall extending upwardly and outwardly from the bottom of the vertical wall to a height substantially equal to that of the top of the barrier rib, and with the vertical wall forming an open channel about the tray portion.

MELVIN H. LEVI.